US005129352A

United States Patent [19]

Roberts

[11] Patent Number: 5,129,352

[45] Date of Patent: Jul. 14, 1992

[54] BEVERAGE TIMING METHOD AND APPARATUS

[75] Inventor: Melvin F. Roberts, Niles, Ill.

[73] Assignee: Specialty Equipment Companies, Inc., Chicago, Ill.

[21] Appl. No.: 539,083

[22] Filed: Jun. 15, 1990

[51] Int. Cl.[5] ........................ G09F 11/04; G01D 13/24

[52] U.S. Cl. .................................... 116/308; 116/201; 116/318

[58] Field of Search .................. 99/285, 342; 116/308, 116/307-309, 316, 318; 40/310, 311; 222/23, 475.1, 27, 39

[56] References Cited

U.S. PATENT DOCUMENTS

| | | | |
|---|---|---|---|
| 576,833 | 2/1897 | Chapman | 116/308 |
| 1,754,203 | 4/1930 | Gibson | 116/316 X |
| 1,796,398 | 3/1931 | Richardson | 116/308 |
| 2,939,420 | 6/1960 | Hewitt | 116/308 |
| 4,090,648 | 5/1978 | Roberts | 222/570 |
| 4,532,142 | 7/1985 | Dean | 426/388 |
| 4,773,563 | 9/1988 | Taylor | 222/144.5 |
| 4,838,463 | 6/1989 | Roberts | 222/465.1 |

FOREIGN PATENT DOCUMENTS

| | | | |
|---|---|---|---|
| 2715087 | 10/1978 | Fed. Rep. of Germany | 99/285 |
| 1166645 | 11/1958 | France | 116/318 |

*Primary Examiner*—William A. Cuchlinski, Jr.
*Assistant Examiner*—W. Morris Worth
*Attorney, Agent, or Firm*—Myers & Associates, Ltd.

[57] ABSTRACT

A timing device for association with a conventional coffee decanter wherein the device comprises a collar for mounting on the neck of the decanter and a tab extending from the collar and mounting an adjustable timing device for indicating time of placement of a fresh brew into the decanter and/or time when the brew is stale and should be discarded.

15 Claims, 2 Drawing Sheets

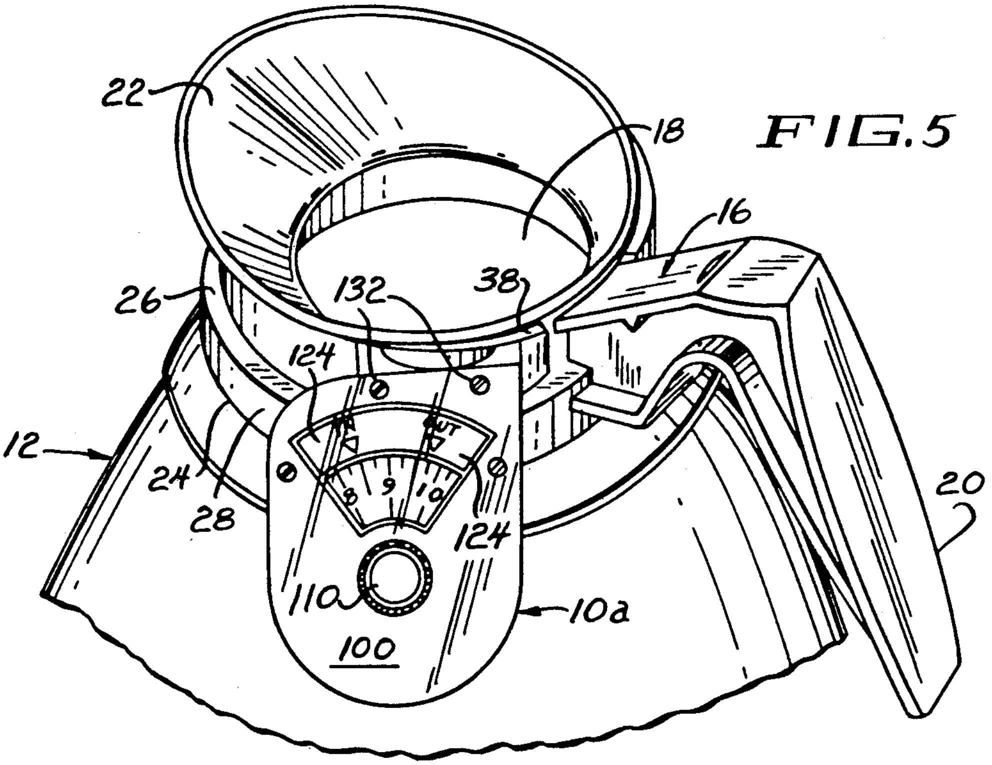
FIG.5
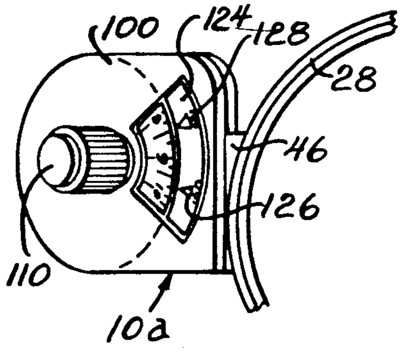
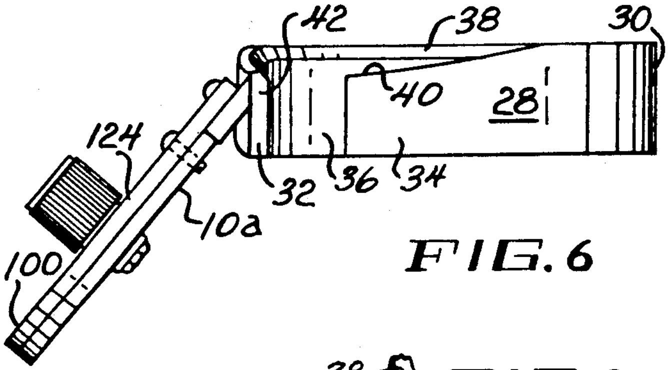
FIG.6
FIG.7
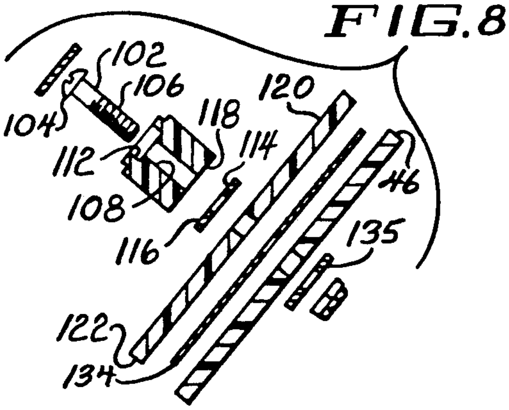
FIG.8
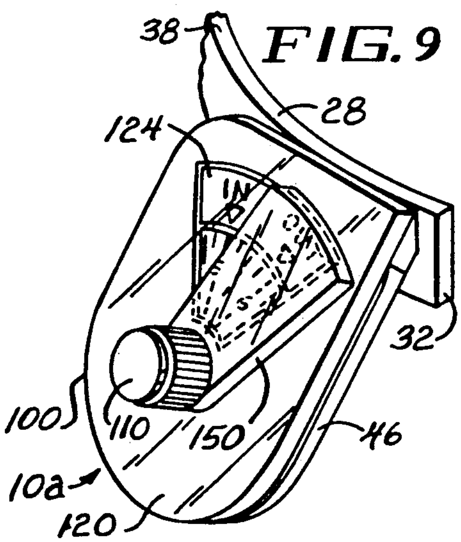
FIG.9

BEVERAGE TIMING METHOD AND APPARATUS

BACKGROUND OF THE INVENTION

This invention relates to method and apparatus for providing an adjustable time indication on a newly prepared or brewed beverage in order to indicate to the beverage user or server when the unused portion of the beverage should be discarded. The method and apparatus are particularly well suited for use with decanters of brewed liquid coffee but may be readily adapted for use with other beverages.

A brewed beverage such as coffee, tea, soup, etc., often has a limited life span within which the beverage retains its most desirable taste. After the desirable taste life span has passed, the beverage is adversely affected in that the beverage taste is less desirable, or even unpleasant, to consumers. The desirable taste life span varies from beverage to beverage. With brewed coffee, for example, the desirable taste life span is about 30 minutes. After that time, any unused coffee in a decanter should be discarded because the taste begins to become less palatable or even unpleasant as further time passes. More discriminating food establishments have a rule of discarding unused brewed coffee after the passage of approximately one-half hour because unpleasant tasting coffee is unpalatable to most customers and tends to downgrade the establishment in the eyes of such customers.

For ease of reference hereinafter the most desirable taste life span of a beverage will be referred to as the "palatable span", and a beverage which has passed its palatable span will be referred to as "over-aged". Also for ease of reference the beverage principally referred to will be coffee, but it will be understood that the principles of the invention are applicable to any brewed beverage having a palatable span.

PRIOR ART BEVERAGE TIMING

In an effort to avoid serving coffee which has passed its palatable span, discriminating users and better food establishments have relied upon various memory aids in an effort to avoid using and serving over-aged coffee. Various means have been utilized such as noting the time on a clock, setting a mechanical or electronic timer, or simply relying upon an innate sense of timing. Some prior art beverage timing systems are better than others, but no prior art system known to the inventor herein is really adequate.

No formal search has been undertaken to uncover prior art beverage timing systems. The inventor has instead relied upon observation during his years of experience in the beverage equipment and handling field, during which time he has never been made aware of a beverage timing method or apparatus according to the principles described and claimed hereinafter.

SUMMARY OF THE INVENTION

The beverage timing method of the present invention includes the placement of a warning device in the form of an adjustable time indication device on the vessel from which the beverage is to be served and the setting of the time indication device to clearly display the time at which the beverage will become over-aged. When the time displayed on the time indication device has been reached, the palatable span of the beverage has passed and the user or server can then dispose of any unused beverage in the vessel.

The beverage timing apparatus of the invention is specifically adapted for use with a beverage container such as a coffee decanter with a handle and spout unit secured at the top like those disclosed and claimed in the applicant's U.S. Pat. No. 4,090,648 dated May 23, 1978 and his U.S. Pat. No. 4,838,463 dated Jun. 13, 1989. The beverage timing apparatus includes a collar or clamp ring which is arranged for being removably secured about the narrow portion of the neckband of the decanter and which carries an adjustable time indicator, including a clock face, an adjustable hour hand and an independently adjustable minute hand. The time indicator is carried by an integral tab extending outwardly from the clamp ring and is so located that the tab and time indicator are out of the way of the pouring spout but in plain sight of the user of the beverage container. This arrangement permits the user to readily set the time indicator to the time at which the beverage in the container will become over-aged, at which time the user will be made aware that the unused beverage in the container should be discarded. The location of the time indicator on the removable clamp ring permits ready removal of the entire timing apparatus from the beverage decanter when desired.

BRIEF DESCRIPTION OF THE DRAWINGS

FIG. 5 is a fragmentary perspective view of another embodiment of the invention;

FIG. 6 is a cross-section view of the device;

FIG. 7 is a horizontal sectional view taken on line 7—7 of FIG. 5;

FIG. 8 is an exploded view of the device; and

FIG. 9 is a perspective view of a further embodiment;

DETAILED DESCRIPTION OF FIGS 1-4 OF THE INVENTION

Figure 1:
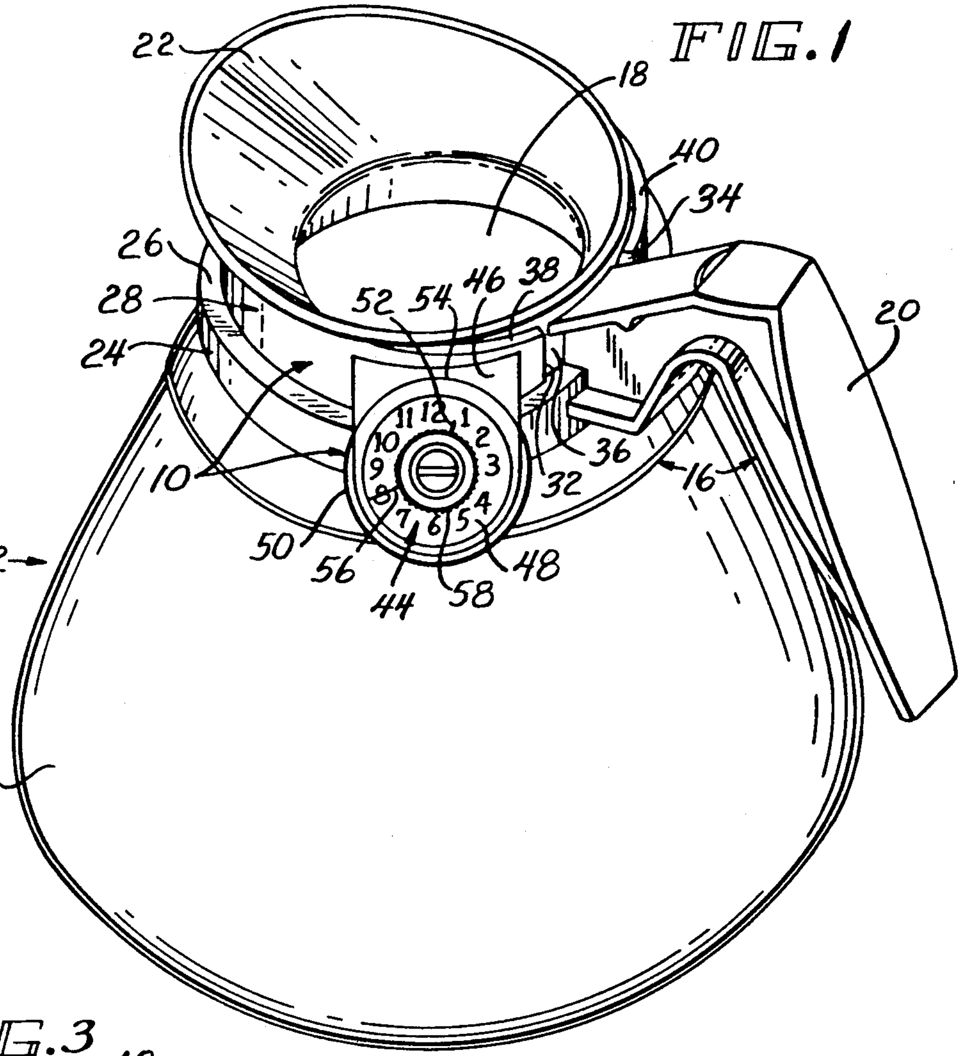
FIG. 1 is a perspective view of a coffee decanter with the beverage timing apparatus of the present invention secured in place on the neckband of the decanter handle and spout unit.

The beverage timing apparatus according to the invention is generally designated by the reference numeral 10 and is adapted for being removably secured to a beverage container such as a coffee decanter 12 shown in FIG. 1. The coffee decanter 12 comprises a glass bowl 14 with a plastic handle and neckband unit 16 fixedly secured to an annular glass rim (not shown) at the top of the glass bowl 14 to provide a top dispensing opening 18. The handle and neckband unit 16 includes an integral handle 20 located radially opposite to an extended portion of an integral pouring lip 22. The decanter 12 may be essentially the same as that disclosed and claimed in applicant's U.S. Pat. No. 4,838,463 issued Jun. 13, 1989. However, to better accommodate the beverage timing apparatus 10, the annular shoulder of applicant's patented decanter is enlarged to form a shoulder 24 which has a horizontal annular support ledge 26 upon which the beverage timing apparatus 10 rests when assembled on the decanter as shown in FIG. 1.

Figure 3:
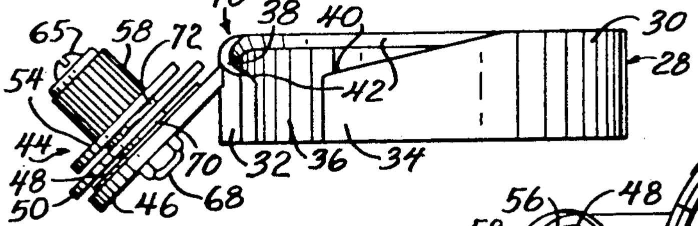
FIG. 3 is a side elevational view of the beverage timing apparatus.
Figure 2:
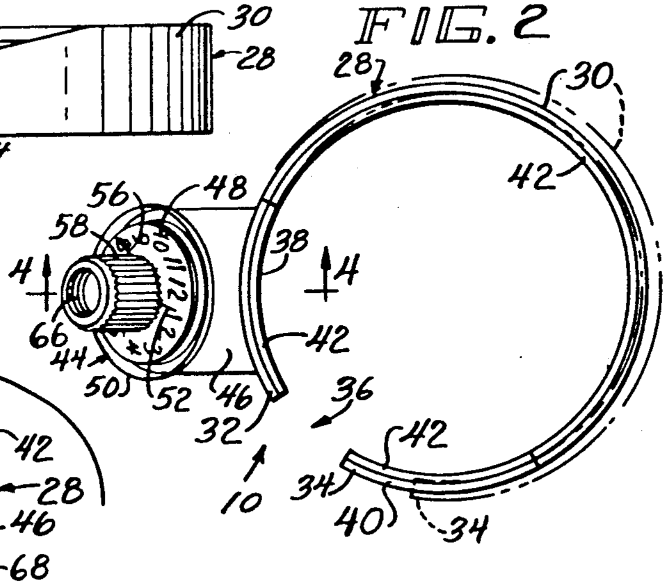
FIG. 2 is a top elevational view of the beverage timing apparatus of FIG. 1 when removed from the decanter, showing in phantom lines the expanded position of the collar clamp ring for removal or replacement of the timing apparatus.

FIGS. 2 and 3 show the beverage timing apparatus 10 removed from the decanter 12. The timing apparatus includes a flexible attachment collar or clamp ring 28 which is formed as a circular band including a flexible annular body portion 30 extending between a proximal end portion 32 and a distal end portion 34 separated by a split or gap 36. The free internal diameter of the clamp ring 28 is less than the external diameter of the narrowest portion of the neckband unit 16 of the decanter immediately above the shoulder 24. The clamp ring 28 is formed of a relatively rigid plastic material which has sufficient resilience to permit widening of the gap 36 by spreading the proximal end 32 from the distal end 34, or vice versa, to permit the clamp ring 28 to be sprung open in order to be assembled about and to resiliently grip the narrowest portion of the neckband unit 16 with its bottom margin resting on the support ledge 26 and with the gap 36 providing sufficient space to accommodate the width of the handle 20 (as shown in FIG. 1). When assembled on the decanter the material and dimensions of the flexible clamp ring 28 provide resilient resistance to spreading sufficient to snugly retain the clamp ring in its assembled position during all normal usage. Nevertheless, the clamp ring 28 may be readily removed from the neckband unit 16 by manually separating the proximal end 32 from the distal end 34, thus widening the gap 36 a sufficient amount to permit the timing apparatus 10 to be manually removed from the neckband unit 16. The approximate amount of enlargement of the gap 36 and consequent increase in diameter of the body portion 30 required to permit removal of the clamp ring from the neckband unit is illustrated in phantom lines in FIG. 2.

To further enhance the security and snug fit of the clamp ring 28 about the narrowed neck of the neckband unit 16, the top margin of the proximal end portion 32 is formed with a downwardly sloping bevel 38, and the top margin of the distal end portion 34 is formed with an opposite sloping bevel 40 as best seen in FIG. 3. The bevels 38 and 40 are formed such that they generally correspond with the marginal edges of the pouring lip 22 adjacent the handle 20 when the clamp ring 28 is assembled on the decanter as shown in FIG. 1. To further enhance the snug fit, the upper inner edge of the clamp ring may be beveled as shown at 42 to generally conform with the sloping external surface of the pouring lip 22.

It should be noted that the use of the flexible clamp ring 28 permits the beverage timing apparatus 10 to be used with coffee decanters having neckband units of differing sizes. The specific coffee decanter 12 disclosed herein is manufactured by Bloomfield Industries, the assignee of the present invention. However, the beverage timing apparatus 10 may also be used with decanters of other manufacturers in which the neckband units are somewhat smaller or larger in neck diameter. The use of the flexible clamp ring 28 thus permits the beverage timing device to be used on a large variety of different coffee decanters. It should be understood, therefore, that the use of the timing apparatus is not limited to attachment to coffee decanters of the inventor's assignee only.

Figure 4:
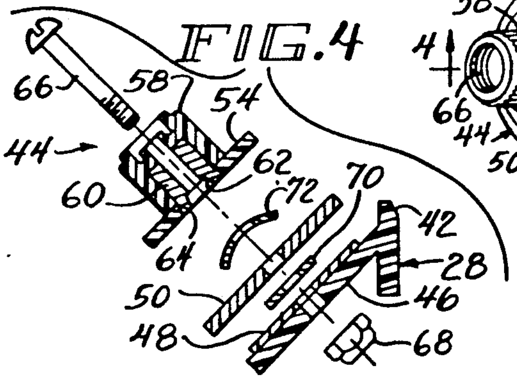
FIG. 4 is an exploded sectional view taken along line 4—4 of FIG. 2.

According to the invention, a warning device in the form of an adjustable time indicator 44 is carried by a support tab 46 which is integrally connected or otherwise fixedly secured to the proximal end portion 32 of the clamp ring 28. The support tab 46 extends outwardly and downwardly at an acute angle from the upper margin of the proximal end portion 32 (as best seen in FIGS. 3 and 4). Because the support tab 46 and the adjustable time indicator which it carries are disposed adjacent to the handle 20 of the pouring spout unit, they are out of way of the extended portion of the pouring lip 22 and in a position where the adjustable time indicator is in full view of the user of the coffee decanter 12.

The adjustable time indicator 44 provides a clock face, an adjustable hour hand and an independently adjustable minute hand so that the user of the decanter 12 can readily set the time indicator to the time when the newly brewed beverage will become over-aged in order that the user will be made aware when any unused beverage in the decanter should be discarded (approximately 30 minutes in the case of brewed coffee). A particularly easy to use, durable and easy to read time indicator 44 is provided by the present invention. The numbers and markings of a clock face are displayed on the face of the support tab 46 which is observable by the user of the decanter. The clock face may be marked directly on the face of the support tab, for example, by hot stamping. Alternatively, according to the embodiment of the invention shown in the drawings the clock markings are provided on a clock face disk 48 which is cemented or otherwise permanently secured to the outward face of the support tab 46.

While a number of different devices may be utilized to provide an adjustable hour hand and an independently adjustable minute hand in front of the clock face 48, in the embodiment shown a particularly durable and easily adjustable mechanism is provided for spacing and frictionally associating the clock hands. A pair of transparent plastic, separately rotatably adjustable disks are concentrically superimposed in spaced relation over the clock face 48, comprising an inner plastic hour hand disk 50 carrying an hour hand mark 52 and an outer plastic minute hand disk 54 carrying a minute hand mark 56. The hour hand mark 52 on the inner transparent disk 50 may be provided by hot stamping, inscribing or embedding an hour hand mark in the material of the disk. In the same manner, the minute hand mark 56 may be formed on the outer disk 54 by hot stamping, inscribing or embodiment.

A fluted or knurled plastic adjustment knob 58 is concentrically fixedly secured to the front face of the outer minute hand disk 54. This is accomplished by concentrically embedding a metallic bushing 60 within the plastic knob, the bushing being provided with an integral annular staking ring 62 which extends beyond the inward end of the knob and into a conforming aperture 64 in the disk 54; the staking ring 62 is staked in place in a well known manner by expanding its periphery radially outwardly with a suitable tool (not shown), the final staked attachment being shown in FIG. 4.

For rotatably adjustably securing the two disks 50 and 54 to the support tab 46 over the clock face 48, a screw 66 passes through concentric apertures through the knob 58, the bushing 60, the inner disk 50, the clock face 48 and finally through the support tab 46 (as best seen in the exploded view FIG. 4). The inner end of the screw is threadly engaged by a suitable locknut 68, preferably a fiber locknut, disposed against the inner face of the support tab 46 as shown in FIG. 3. A flat metallic washer 70 is concentrically disposed between the clock face 48 and the rearward face of the inner hour hand disk 50, with the shank of the screw 66 passing through the washer, in order to space the inner disk from the clock face. A suitable metallic spring washer 72 is concentrically disposed between the front face of the inner disk 50 and the rearward face of the outer disk 54 to space the two disks and to impose a separating force between the disks when the inner end of the screw 66 is secured to the locknut 68. A bowed washer 72 of thin metallic spring material, as shown in FIG. 4, is suitable for this purpose.

It will be understood that the concentric apertures through

It will be understood that the concentric apertures through the adjustment knob 58, the bushing 60, the inner disk 50, the clock face 48 and the support tab 46 are snug but permit free rotation about the screw 66. When the screw 66 is assembled in place with its head bearing against the outer end portion of the adjustment knob and its inward end is threadly secured to the locknut 68, the nut is tightened on the screw to flatten the spring washer 72 sufficiently to impose a separating force between the two disks 50 and 54 and to provide a slight compressive force between the inner disk 50, the flat washer 70 and the clock face 48.

The inner disk 50 carrying the hour hand mark is somewhat larger in diameter than the outer disk 54 carrying the minute hand mark so that the inner disk may be readily manipulated to set the hour hand 52 to the desired hour position with respect to the clock face without interference by the outer disk. This also permits the user to hold the inner disk at its adjusted position while the outer disk is readily manipulated through the adjustment knob 58 to set the desired minute position of the minute hand 56 with respect to the clock face 48. With the particular arrangement as described it is anticipated that the user will first rotate the inner disk to set the hour hand to the desired location and will then hold the inner disk in place while adjusting the minute hand to its desired position through manipulation of the knob 58 in order to insure that manipulation of the outer disk does not cause misadjustment of the inner disk.

It should be understood that the locknut is turned onto the screw end until the desired separating and compressive forces are imposed to permit the inner hour hand disk 50 to be rotatably manipulated by its extending edge and to permit the outer minute hand disk 54 to be independently rotatably manipulated through the adjustment knob 58. The arrangement is such that adjustment of either the inner hour hand disk 50 or the outer minute hand disk 54 will either not change the position of the other disk, or will permit the disks to be independently rotatably adjusted while holding one and adjusting the other.

From the foregoing description it will be understood that the user of the coffee decanter 12 with the timing apparatus 10 in place will observe the time when brewing of a new decanter full of coffee has been completed. The user will then independently adjust the inner hour hand disk 50 and the outer minute hand disk 54 to a later time when any unused coffee in the decanter will become over-aged. It is generally agreed by coffee experts that approximately one-half hour is the most desirable palatable span of a decanter of coffee, so that the user will set the time indicator 44 for a time approximately one-half hour ahead of the current time after a decanter full of liquid coffee has been brewed.

It will also be understood that a warning device which would give a signal other than a visible time indication signal could be substituted for the time indicator 44. For example, a device which will emit an audible tone when the palatable span of the beverage in the container has ended may be substituted for the time indicator 44. Alternatively, a warning device which will give both a visible signal and an audible signal when the palatable span of the beverage in the container has ended may be substituted for the time indicator 44.

The method of brewed coffee timing according to the present invention may be advantageously performed utilizing the apparatus described above. In essence, the method contemplates placing a warning device such as the adjustable time indication apparatus as disclosed on a coffee decanter to be used for brewing purposes. When the decanter has been filled with newly brewed liquid coffee, the user then observes the current time and sets the timing apparatus to indicate a time one-half hour later. The decanter with the brewed coffee is retained on a suitable warmer (not shown) in a position whereby the time indicator may be readily observed. In the usual course, the user will serve coffee from the decanter from time to time and will place it back on the warming device to maintain the coffee hot. If any remains after the time has passed, the user will discard the crushed coffee and will free the decanter with fresh brewed coffee and will again reset the time as beforestated.

DESCRIPTION OF FIGS. 5–7

This embodiment of the invention is similar to FIGS. 1–4 and like parts will be identified by the same reference numerals.

The timing device generally designated **10*a* is adopted to be removably sleeved onto a beverage container 12. The container comprises a glass bowl 14 with a plastic handle 15 and a neckband 16 fixedly embracing an annular glass neck (not shown) at the top of the glass bowl to provide a top dispensing opening 18**.

The handle and neckband unit 16 includes an integral handle 20 located radially opposite to an extended portion of an integral pouring lip 22 similar to that previously described and includes a shoulder 24 which has an annular support ledge 26 upon which the beverage timing device **10*a* rests when assembled with the coffee dispensing pot 12 as shown in FIG. 5**.

FIGS. 6 and 7 show the timing device **10*a* removed from the decanter 12. The device comprises a flexible, preferably plastic attachment collar 28 which is formed as an annular band or clamp ring including a flexible annular body portion 30 extending between a proximal end portion 32 and a distal end portion 34 separated by a split or gap 36**.

The internal diameter of clamp ring 28 is less than the external diameter of the narrowest portion of the mechanical unit 16 of the decanter immediately above the shoulder 24.

FIGS. 6 and 7 show the beverage timing apparatus **10*a* removed from the decanter 12. The clamp ring 28 is formed of a relatively rigid plastic material which has sufficient resilience to permit widening of the gap 36 by spreading the proximal end 32 from the distal end 34, or vice versa, to permit the clamp ring 28 to be sprung open in order to be assembled about and to resiliently grip the narrowest portion of the neckband unit 16 with its bottom margin resting on the support ledge 26 and with the gap 36** providing sufficient space to accommodate the width of the handle 20 (as shown in FIG. 1). When assembled on the decanter the material and dimensions of the flexible clamp ring 28 provide resilient resistance to spreading sufficient to snugly retain the clamp ring in its assembled position during all normal usage. Nevertheless, the clamp ring 28 may be readily removed from the neckband unit 16 by manually separately the proximal end 32 and the distal end 34, thus widening the gap 36 a sufficient amount to permit the timing apparatus 10a to be manually removed from the neckband unit 16. The approximate amount of enlargement of the gap 36 and consequent increase in diameter of the body portion 30 required to permit removal of the clamp ring from the neckband unit is illustrated in phantom lines in FIG. 7.

To further enhance the security and snug fit of the clamp ring 28 about the narrowed neck of the neckband unit 16, the top margin of the proximal end portion 32 is formed with a downwardly sloping bevel 38, and the top margin of the distal end portion 34 is formed with an opposite sloping bevel 40 as best seen in FIG. 5. The bevels 38 and 40 are formed such that they generally correspond with the marginal edges of the pouring lip 22 adjacent the handle 20 when the clamp ring 28 is assembled on the decanter as shown in FIG. 5. To further enhance the snug fit, the upper inner edge of the clamp ring may be beveled as shown at 42 to generally conform with the sloping external surface of the pouring lip 22.

It should be noted that the use of the flexible clamp ring 28 permits the beverage timing apparatus 10 to be used with coffee decanters having neckband units of differing sizes. The specific coffee decanter 12 disclosed herein is manufactured by Bloomfield Industries, the assignee of the present invention. However, the beverage timing apparatus 10 may also be used with decanters of other manufacturers in which the neckband units are somewhat smaller or larger in neck diameter. The use of the flexible clamp ring 28 thus permits the beverage timing device to be used on a large variety of different coffee decanters. It should be understood, therefore, that the use of the timing apparatus is not limited to attachment to coffee decanters of the inventor's assignee only.

According to the invention, a warning device in the form of an adjustable time indicator 100 is carried by the support tab 46 which is integrally connected or otherwise fixedly secured to the proximal end portion 32 of the clamp ring 28. The support tab 46 extends outwardly and downwardly at an acute angle from the upper margin of the proximal end portion 32 (as best seen in FIGS. 6 and 4). Because the support tab 46 and the adjustable time indicator which it carries are disposed adjacent to the handle 20 of the pouring spout unit, they are out of way of the extended portion of the pouring lip 22 and in a position where the adjustable time indicator is in full view of the user of the coffee decanter 12.

The adjustable time indicator in the embodiment generally designated 100 comprises a center bolt 102 which has a head 104 at one end and a shank 106 extending therefrom through a center bore 108 in a manipulating knob 110. The head is recessed into a counter bore 112 in the outer end of the knob. The shank extends through an aperture in a washer 114 which has one side or outer face 116 engaging the inner end face 118 of the knob. The washer seats against the outer face 120 of an indicator disk 122. Disk 122 has an arcuate sector or section 124 imprinted thereon, the sector being inscribed about the axis of the bolt and imprinted with pair of arrow shape indicators 126, 128 in the arcuate sector 124. The indicators are circumferentially separated a predetermined distance and are labeled "in" and "out".

The disk 122 is fixed to the tab 46 by screws 132 or by adhesive.

A clock face disk 134 is mounted on the shank 106 and is secured thereto or adhered thereto by suitable adhesive for rotation with the knob to which the shank may also be adhered. The clock face disk 134 is positioned between the outer disk 122 and the outer face of the tab and is rotatable thereover and registers against one arrow indicating the time when the coffee was poured into the decanter and the other arrow being designated "out" to indicate when the coffee is stale and should be discard.

It will be understood that certain coffees may stand in the canister for an hour while others may stand forty-five minutes or only one half hour and then are discard. For example, if the spread between the arrows is one hour and the time of filling the decanter is 11:00 o'clock, the clock-face disk 134 would be rotated to align the "in" arrow to point to 11:00 o'clock then the "out" indicator would automatically point to 12:00 o'clock.

The shank is threaded and extends through the tab 46 and through an opening in a washer 135. The bolt is secured by a locking nut 136.

Rotation of the knob will reset the clock to align the "in" indicator with the actual time shown by the clock disk 134.

DESCRIPTION OF FIG. 9

FIG. 9 is similar to FIGS. 5 through 8 and the like parts are identified by the same reference numerals.

The embodiment differs from that of FIG. 5–8 in providing a transparent plastic sector finger 150 which is pivoted at one end on the shank of the mounting bolt and is swingable thereabout. It has the "out" indicia imprinted thereon.

After the users sets the time with the clock face in registry with the "in" indicator, the finger is then set to register with the clock indicia to whatever time he wishes. He may set it for 10 minutes or an hour, in accordance with the palatability of the brew.

It will be apparent that varies forms of the invention can be made from the foregoing disclosure within the scope of the appended claims.

I claim:

1. A method for visually indicating the palatable time span of a brewed beverage in a container for guarding against use of beverage remaining in the container after passage of the palatable time span, comprising the steps of securing an adjustable warning device having a base with clock face indicia thereon a including first and second rotatable disks respectively provided with a minute indicia mark and hour indicia mark on the container;

dispensing newly brewed beverage into the container; and rotating said first and second disks about a common axis to align said minute indicia mark and said hour indicia mark with respective numbers visually representing time for setting the warning device to a future time to indicate the end of the palatable span of the brewed beverage in the container.

2. The method of claim 1 in which the warning device is a time indicator which provides a visible time indication.

3. The method according to claim 1 in which the beverage is coffee and the palatable span is one-half hour.

4. The method according to claim 2 in which the container has a handle and wherein the time indicator is placed adjacent the handle in order to be readily observed by any person desirous of dispensing brewed beverage from the container.

5. The method according to claim 1 including the steps of:

retaining the container with newly brewed beverage on a warmer and dispensing brewed beverage from the container at any time up to the future time set on the warning device; and discarding any brewed beverage remaining in the container after the future time set on the warning device has been reached.

6. The method of claim 5 in which the warning device is a time indicator which provides a visible time indication.

7. The method according to claim 6 in which the beverage is coffee and the palatable span is one-half hour.

8. Apparatus for use with a container of brewed beverage for guarding against use of beverage in the container which has passed the palatable span of the beverage, comprising:

an adjustable time indicator means adapted for being secured to the container;

means for setting said time indicator means to display a visible time indication of the end of the palatable span of the beverage in the container to warn against use of beverage remaining in the container after the end of the palatable span, said time indicator means having a means providing a clock face facing outwardly, a pair of transparent, separately rotatably adjustable disks concentrically superimposed in spaced relation over said clock face, an hour hand mark formed on one of said disks; and minute hand mark formed on the other of said disks, whereby said disks may be separately rotatably adjusted with respect to said clock face to cause said hour hand mark and said minute hand mark to indicate the end of the palatable span of the beverage in the container.

9. Apparatus according to claim 8 comprising:

a flexible clamp ring having a split therein to permit resilient spreading of the ring in order to permit the ring to be removably secured to containers of varying sizes; and means for attaching said time indicator means to said clamp ring, whereby said time indicator means may be removably secured to containers of varying sizes.

10. Apparatus according to claim 9 adapted for being secured to a beverage container having a handle and a pouring spout on the side of the container opposite to the handle, wherein:

said clamp ring is adapted for being secured to said container with said split spanning said handle, and said means for attaching attaches said time indicator means adjacent the split in said clamp ring so that said time indicator means is disposed in an observable position adjacent said handle and away from said pouring spout.

11. Apparatus according to claim 9 in which said means for attaching comprises a support tab which is fixedly secured to said clamp ring.

12. Apparatus according to claim 11 in which said support tab extends downwardly and outwardly at an acute angle from an upper margin of the clamp ring.

13. Apparatus according to claim 12 in which said time indicator means includes:

said clock face formed on said support tab and facing outwardly;

one of said pair of disks being a first transparent, separately rotatably adjustable disk concentrically attached in superimposed relation over said clock face;

the other of said pair of disks being a second transparent, separately rotatable adjustable disk concentrically attached outwardly of said first disk in superimposed spaced relation and having a diameter smaller than the diameter of said first disk;

an adjustment knob concentrically fixedly secured to said second disk on an outward side thereof;

whereby said hour hand mark and said minute hand mark may be independently adjusted with respect to said clock face by independent adjustment of said disks with repsect to said clock face to the time at which the beverage in the container will reach the end of its palatable span to indicate when the beverage should be discarded.

14. Apparatus for use with a container of brewed beverage for guarding against use of beverage in the container which has passed the palatable span of the beverage, comprising:

an adjustable time indicator means adapted for being secured to the container;

means for setting said time indicator means to display a visible time indication of the end of the palatable span of the beverage in the container to warn against use of beverage remaining in the container after the end of the palatable span, said time indicator means having means providing a clock face facing outwardly, a pair of transparent, separately rotatably adjustable disks concentrically superimposed in spaced relation over said clock face, an hour hand mark formed on one of said disks; and minute hand mark formed on the other of said disks, whereby said disks may be separately rotatably adjusted with respect to said clock face to cause said hour hand mark and said minute hand mark to indicate the end of the palatable span of the beverage in the container, one of said disks is of a larger diameter than the other of said disks for enhancing separate adjustment of the disks for setting the respective positions of the hour hand mark and the minute hand mark.

15. Apparatus according to claim 14 in which: the disk having the largest diameter is disposed inwardly with respect to the other disk; and an adjustment knob secured to said other disk outwardly thereof for permitting adjustment of said disks independently of each other.

* * * * *